US007160412B2

(12) United States Patent
Baumli

(10) Patent No.: US 7,160,412 B2
(45) Date of Patent: Jan. 9, 2007

(54) METHODS AND APPARATUS FOR PRODUCING AND FOR APPLYING LABELS

(76) Inventor: Peter J. Baumli, Unit 1/11-21 Marquet Street, Rhodes NSW 2138 (AU)

( * ) Notice: Subject to any disclaimer, the term of this patent is extended or adjusted under 35 U.S.C. 154(b) by 49 days.

(21) Appl. No.: 10/476,422

(22) PCT Filed: May 1, 2002

(86) PCT No.: PCT/AU02/00536

§ 371 (c)(1),
(2), (4) Date: Apr. 1, 2004

(87) PCT Pub. No.: WO02/089099

PCT Pub. Date: Nov. 7, 2002

(65) Prior Publication Data

US 2004/0177931 A1 Sep. 16, 2004

(30) Foreign Application Priority Data

May 1, 2001 (AU) .................................... PR4711
Dec. 6, 2001 (AU) .................................... PR9348

(51) Int. Cl.
*B32B 37/20* (2006.01)

(52) U.S. Cl. ...................... 156/256; 156/521; 156/517; 156/552; 156/556; 156/566; 83/389.3; 83/389.5

(58) Field of Classification Search ................ 156/521, 156/517, 552, 556, 566, 250; 53/389.3, 389.5
See application file for complete search history.

(56) References Cited

U.S. PATENT DOCUMENTS 3,238,869 A * 3/1966 West et al. ................. 101/228
3,253,544 A * 5/1966 Von Hofe ................... 101/483
4,497,156 A * 2/1985 Scheidegger ................. 53/399
4,660,351 A * 4/1987 Saitoh ......................... 53/417
4,847,130 A * 7/1989 Cooper ...................... 428/41.8
5,637,182 A * 6/1997 Kimura et al. .............. 156/542
6,115,993 A * 9/2000 O'Donnell ................. 53/389.4
2002/0066991 A1* 6/2002 King et al. .................. 271/18

FOREIGN PATENT DOCUMENTS

AU 585313 8/1986
AU 199961809 A 6/2000

(Continued)

*Primary Examiner*—George Koch
(74) *Attorney, Agent, or Firm*—Michael J. Striker

(57) ABSTRACT

An apparatus for applying labels including hanging labels, in the form of a continuous web of material to containers is defined. The apparatus includes first and second reels on which the continuous web material is wound for application to containers by the apparatus. The apparatus includes an automatic splicing arrangement for feeding web material from a second reel after the first reel is exhausted. The labels are in the form of a continuous web of material and no separate support web is provided for the labels. The apparatus includes a pair of interchange rollers and a pair of associated guide means which merge to define a single guide means, and an indexing means disposed adjacent the point where the guide means merge. The interchange rollers are synchronously driven by a single drive means via a servo means or the like. The web of labels is made by printing on one or both sides of the web of material and plough-folding the web of material parallel to the longitudinal axis of the material to generate a succession of joined multi-layer labels or leaflets.

9 Claims, 12 Drawing Sheets

FOREIGN PATENT DOCUMENTS

| | | | | |
|---|---|---|---|---|
| DE | 2 217 032 | | | 10/1973 |
| DE | 2117289 | B | * | 12/1976 |
| DE | 19544010 | A | | 5/1997 |
| EP | 0 306 125 | A1 | | 3/1989 |
| EP | 430567 | B | | 6/1991 |
| EP | 301814 | A | | 6/1992 |
| EP | 0 693 427 | A1 | | 1/1996 |
| GB | 2179021 | A | | 2/1987 |
| WO | WO 94/05578 | A | | 3/1994 |
| WO | WO 98/26985 | | | 6/1998 |
| WO | WO 99.03737 | A | | 1/1999 |
| WO | WO 00/07883 | A | | 2/2000 |
| WO | WO 00/27710 | A | | 5/2000 |
| WO | WO 00/34130 | A | | 6/2000 |
| WO | WO 00/68128 | | | 11/2000 |

* cited by examiner

METHODS AND APPARATUS FOR PRODUCING AND FOR APPLYING LABELS

FIELD OF THE INVENTION

The present invention relates to a method of producing labels and to a method and an apparatus for applying labels to a container such as a box, packet, bottle, tin or the like. In particular aspects, the present invention relates to a method of producing multi-layer labels which may define a through aperture which may be used to "hook" such a label over the neck of a wine bottle or the like and thereby hang the label from the bottle's neck.

BACKGROUND OF THE INVENTION

It is known to produce multi-layer labels for attachment to products. The labels may, for example, carry a guarantee, instructions, details of a competition or the like. Known methods of making such labels utilise a self adhesive label material carried on a backing layer of release material as a base stock and a series of folded leaflet assemblies are attached to the self adhesive label material which is cut and processed to form label/leaflet assemblies for attachment to containers and the like. One such process is described in AU 585313. However, the known methods such as are described in AU 585313 are generally quite complicated, and thus expensive, multi-stage processes and also suffer from high raw material costs due the high costs of self adhesive label material. There are also high levels of wastage during the manufacturing processes. The release material is always wasted. The labels made by such processes are thus expensive to produce.

It is known to manufacture such multi-layer labels carried on a web of release material in an assembly mounted to a sheet of material which defines an aperture which can be used to hook the sheet over the neck of a wine bottle or the like, thereby hanging the label from the bottle. Machines exist which can directly apply such multi-layer labels carried on a web of release material to necks of wine bottles and the like.

An alternative to the manufacture of labels based on self-adhesive stock is to manufacture less expensive labels based on non self-adhesive stock. However, the problem with such labels is that without the web release material to carry the labels, the labels cannot be applied successfully by machine. It is then necessary to apply the labels over the necks of the bottles by hand which is expensive in terms of labour costs and tends to negate the cost savings achieved by the use of cheaper non self-adhesive stock.

One aim of the present invention is to produce an inexpensive multi-layer label. A further aim of the present invention is to provide an improved machine for applying labels to containers and the like, particularly, but not exclusively, hanging labels.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

SUMMARY OF THE INVENTION

In one broad aspect, the present invention envisages a machine for applying a web of joined labels carried on a roll or the like onto containers.

Thus in a first aspect, the present invention provides an apparatus for applying labels in the form of a continuous web of material with no separate support web to containers or the like.

A related aspect provides an apparatus for applying labels in the form of a continuous web of material to containers or the like including first and second reels of the continuous web material characterised by an automatic splicing arrangement for feeding web material from a second reel after the first reel is exhausted.

The apparatus may include a pair of interchange rollers and a pair of associated guide means which merge to define a single guide means and an indexing means disposed adjacent the point where the guide means merge. The interchange rollers are synchronously driven by a single drive means via a servo means or the like.

In a preferred embodiment, the apparatus includes two pairs of spaced apart upper and lower belt means adapted to transport a label, with opposite longitudinal edges of the label carried between the pairs of belt means, forming part of an applicator means for applying the labels over the neck of a bottle or the like.

The expression "labels" as used herein, includes single layer labels, as well as multi-layer labels and "hanging labels".

The apparatus may be used to apply hanging labels to bottle necks wherein the labels include an upper portion defining an aperture through which a neck of a bottle may pass and an associated biasing means for biasing the main body portion against the bottle.

According to a related aspect of the present invention, there is provided a method of manufacturing multi-layer folded printed leaflets or labels comprising the steps of:

providing a web of sheet material having two sides and defining a longitudinal axis;

printing on one or both sides of the web of material; and plough-folding the web of material parallel to the longitudinal axis of the material to generate a succession of joined multi-layer labels or leaflets.

The method may also include the step of applying glue along one side of the web to seal the leaflets.

The method may also include the step of cutting and shaping the labels and forming perforations on the labels adjacent the glue to define a tear off strip or the like enabling the sealed leaflet to be opened.

The labels remain joined to one another as a single web which can be formed into a roll or the like for storage. Thus the first aspect of the present invention generates multi-layer labels in the form of folded leaflets which may be printed on both sides which can be rolled up and which do not require a carrier as the web defines both the labels and the carrier.

The labels can be made from any suitable non-self adhesive stock which creates substantial cost savings.

The labels may be made in any desired shape including in a hanging label form in which an aperture is defined which can be hooked over the neck of a wine bottle or the like.

The labels may have an inside text and outside text. The web material may be folded once, twice or more times in order to create a folded leaflet.

The present invention also envisages a machine for applying a web of joined labels carried on a roll or the like onto containers, thus in a second broad aspect, the present invention provides an apparatus for applying labels in the form of a continuous web of material with no separate support web to containers or the like.

A related broad aspect provides an apparatus for applying labels in the form of a continuous web of material to containers or the like including first and second reels of the continuous web material characterised by an automatic splicing arrangement for feeding web material from a second reel after the first reel is exhausted.

The apparatus may include a pair of interchange rollers and a pair of associated guide means which merge to define a single guide means and an indexing means disposed adjacent the point where the guide means merge The interchange rollers are synchronously driven by a single drive means via a servo means or the like.

In a preferred embodiment, the apparatus includes two pairs of spaced apart upper and lower belt means adapted to transport a label, with opposite longitudinal edges of the label carried between the pairs of belt means, forming part of an applicator means for applying the labels over the neck of a bottle or the like.

The expression "labels" as used herein, includes single layer labels, as well as multi-layer labels and "hanging labels".

The apparatus may be used to apply hanging labels to bottle necks wherein the labels include an upper portion defining an aperture through which a neck of a bottle may pass and an associated biasing means for biasing the main body portion against the bottle.

BRIEF DESCRIPTION OF THE DRAWINGS

The invention will now be described, by way of example only, with reference to the accompanying drawings in which:

FIG. 6 shows a schematic view of a first label application apparatus for applying hanging labels to a wine bottle or the like;

DETAILED DESCRIPTION OF A PREFERRED EMBODIMENT

Figure 1A:
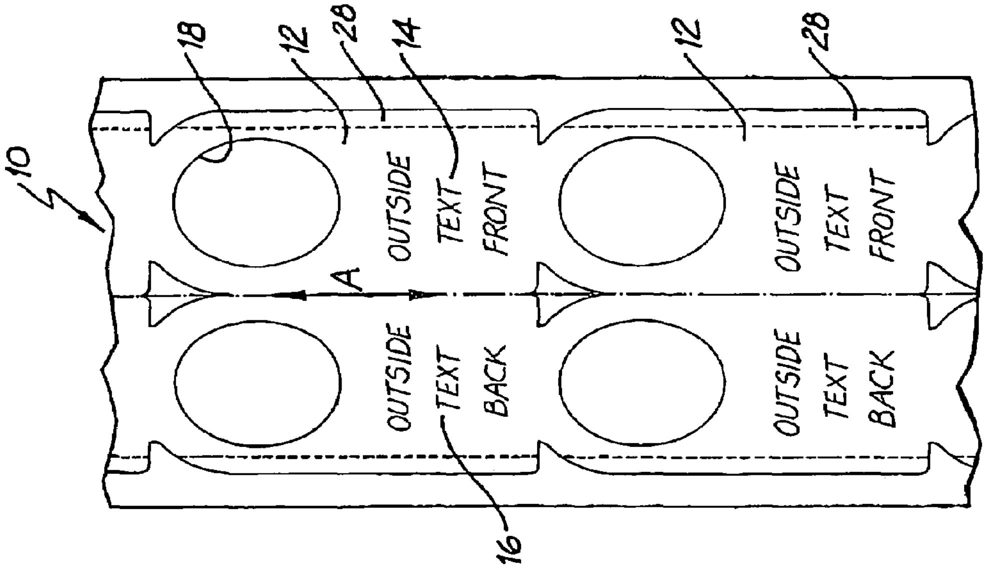
FIG. 1*a* is a front view of a section of a web of sheet material for use in manufacturing multi-layer labels.

Referring to the drawings, FIG. 1*a* shows a short section of a web of material 10, typically paper. The web extends continuously In the direction of longitudinal axis A and may be hundreds of meters long. The Figure shows the front face of the web on which a repeating label design is printed. The same label design is printed as a continuous pattern extending along the entire length of the web. The design is for a hanging label 12 also known as a neck-tag which may have outside text 14 printed on a part of the web which forms the front of the label and outside text 16 printed on the part of the web which is to form the back of the label. The design defines a generally circular portion 18 which in the finished label is cut out to define an aperture 19 through which the neck of a wine bottle, or the like may be inserted to allow the finished label to hang from the neck of that bottle.

Figure 1B:
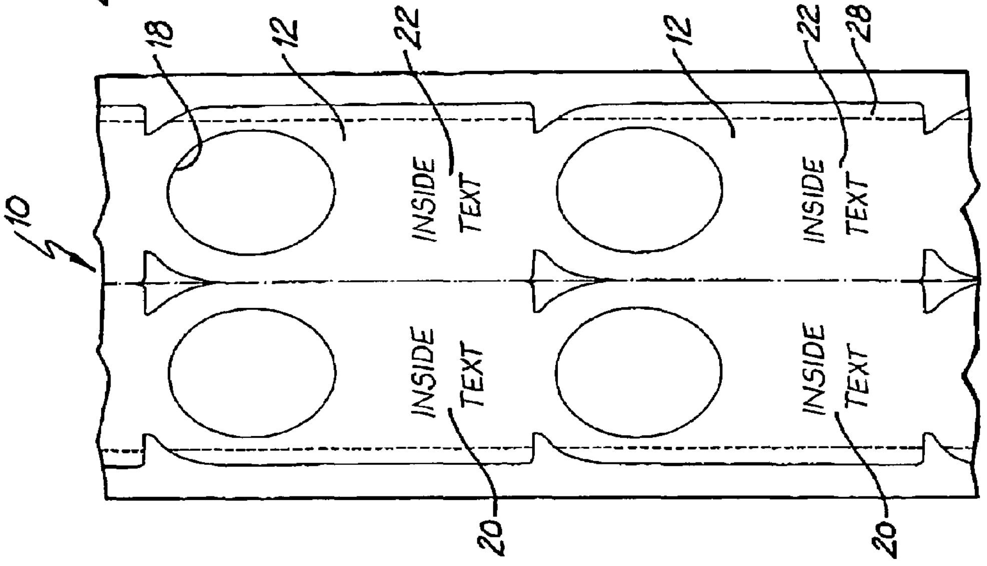
FIG. 1*b* is a rear view of the section of web of FIG. 1*a;*

The reverse face of the web shown in FIG. 1*b* is printed in registration with the front face shown in FIG. 1*a*. "Inside text" 20, 22 which in the finished folded label will appear inside the folded label is printed on that reverse face.

The "text" whether inside or outside may include or comprise images as well as text and is not limited to any particular subject matter. It will typically relate to a competition or special offer but is not limited to that subject matter. The manner in which the design is printed on the web is not critical provided that the designs printed on the front and reverse faces of the web are in correct registration with respect to one another.

Figure 1C:
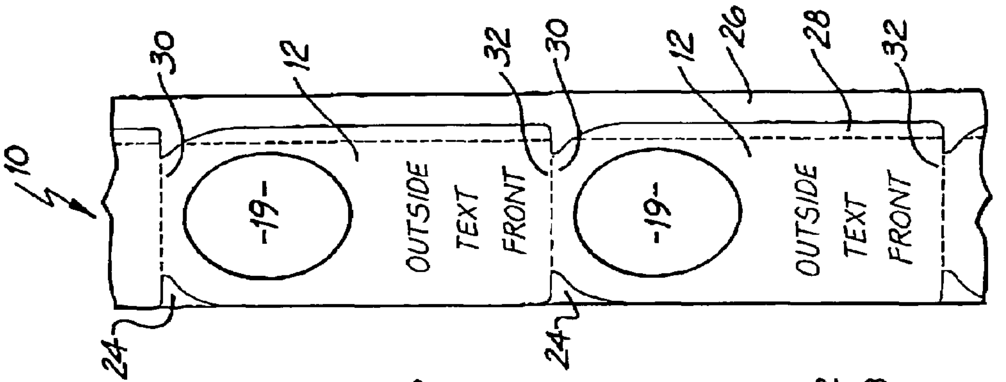
FIG. 1*c* is a view of the section of web shown in FIGS. 1*a* and 1*b* after it has been plough folded and die-cut.

FIG. 1*c* is a schematic view of the label after it has been folded and die-cut to remove the circular cut-out 18 to define the circular aperture 19 and to define a perforation strip 28 which can be tom off to open the label and reveal the inside text 20, 22. There is an amount of waste web material 24, 26 which can be removed at the die-cutting stage or may be removed during the process of applying the labels to containers or the like. It is also necessary to glue the label closed along the tear off/perforation strip 28. Again, the stage at which this process occurs is noncritical.

It is important however that the labels remain joined to one another front end 30 to rear end 32 so that they define a continuous web of material.

As part of the process of label manufacture, prior to, or after plough folding the web, one side of the material may be coated with an adhesive and cured prior to the labels being wound up into reel form. The type of adhesive used may be of the type which may be re-activated at a later stage, days or months later. Heat, ultra violet light, infra-red, or other means, may be used to activate the cured adhesive. This will allow the adhesion of labels onto products, by simply activating the adhesive at point of label application onto the product. The adhesive only covers the part of the label where the label needs to adhere onto the product.

Figure 2C:
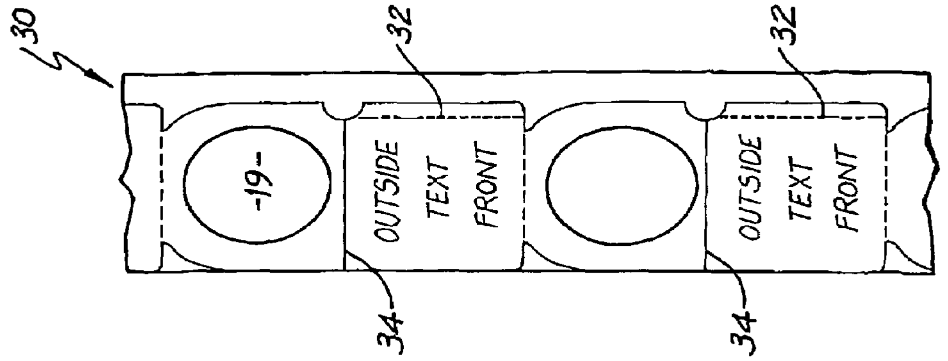
FIGS. 2*a* to 2*c* are corresponding views of a section of a web of sheet material for use in forming a modified label design to that shown in FIG. 1*c;*
Figure 2B:
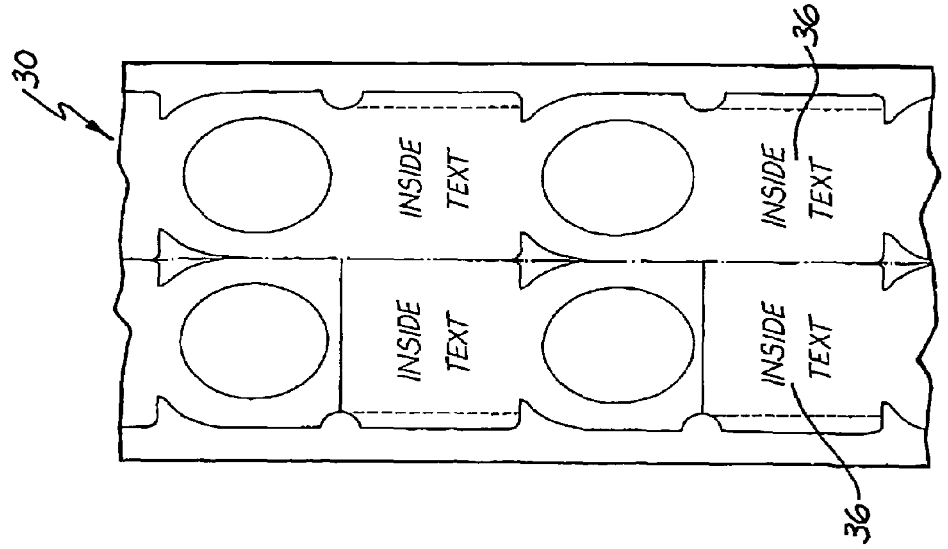
Figure 2A:
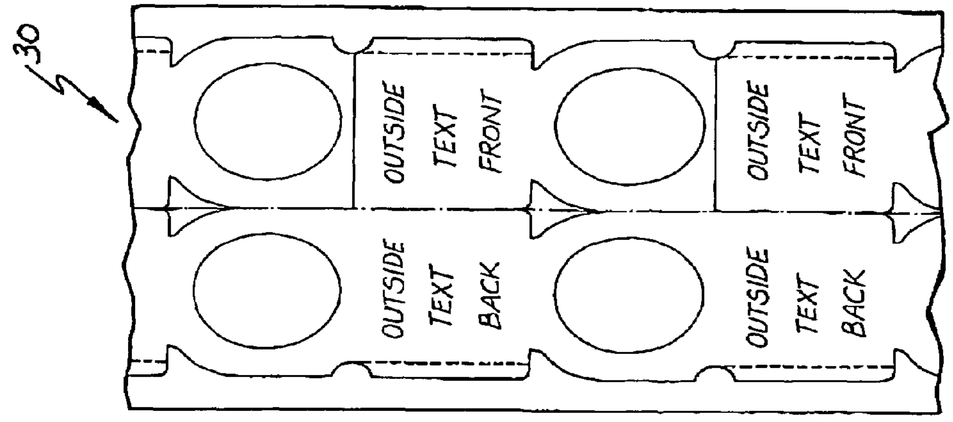

The remaining Figures show different label designs which operate on the same principle as the labels shown in FIGS. 1*a* to 1*c*. In particular. FIGS. 2*a* to 2*c* show a similar design of label 30 to that shown in FIGS. 1*a* to 1*c* but in which perforations 32 which allow the finished label to open extend only part way along the side of the label as far as a transverse cut 34 so that only the lower part of the label opens up to reveal the inside text 36.

Figure 3C:
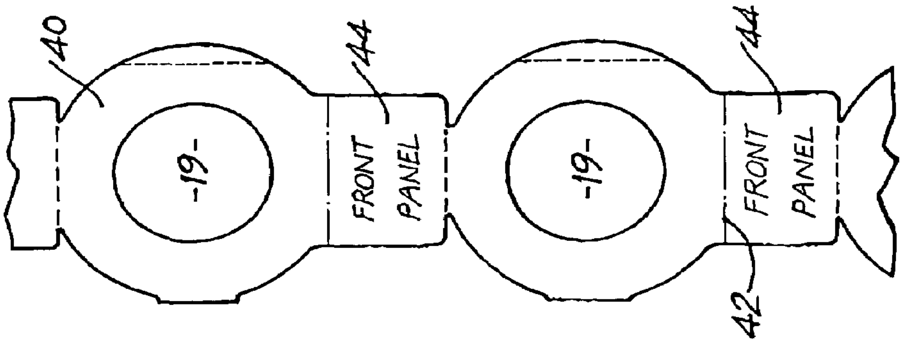
FIG. 3*c* shows the plough folded section of web of FIG. 3*b* after has been die-cut and waste material has been removed.
Figure 3B:
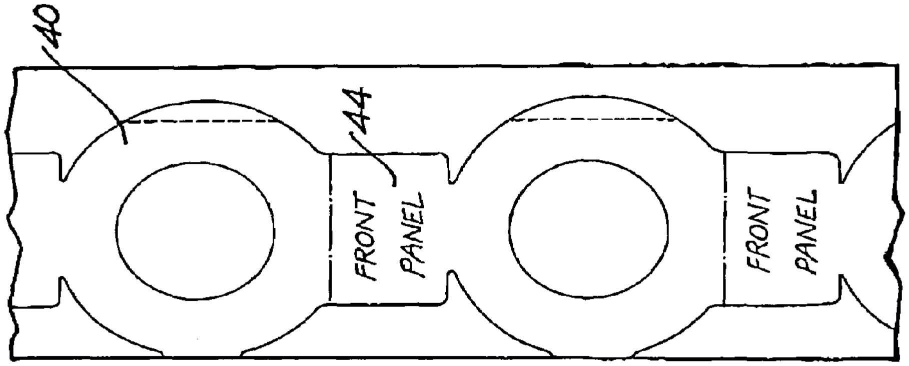
FIG. 3*b* shows the section of web of FIG. 3*a* after it has been plough folded.
Figure 3A:
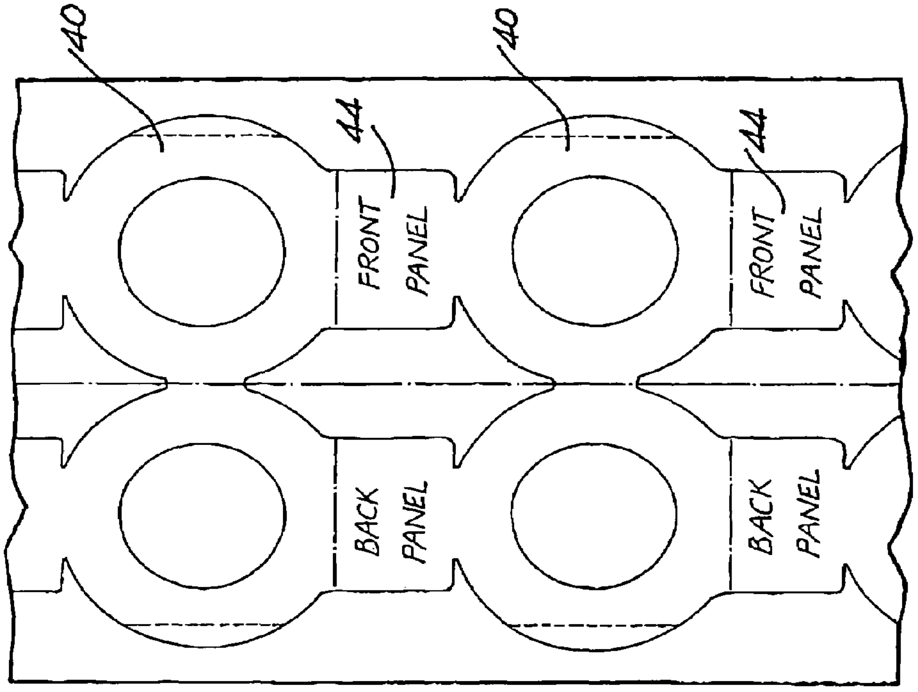
FIG. 3*a* is a front view of a section of a web of sheet material on which a third label design is printed.

FIG. 3*a* shows one side of a web from which a yet further design of hanging label 40 is produced.

FIG. 3*b* shows the web folded over, and FIG. 3*c* shows the folded web die-cut with the waste material removed. In the design shown in FIGS. 3*a* to 3*c* a crease line 42 is formed on the label so that the front panel 44 is oriented at an angle of between about 90 to 140 degrees or so, so that when the aperture 19 is placed over the neck of a bottle, the front panel may lie generally parallel with the sides of the bottle, or at least protrude less than if the label were planar.

Figure 4B:
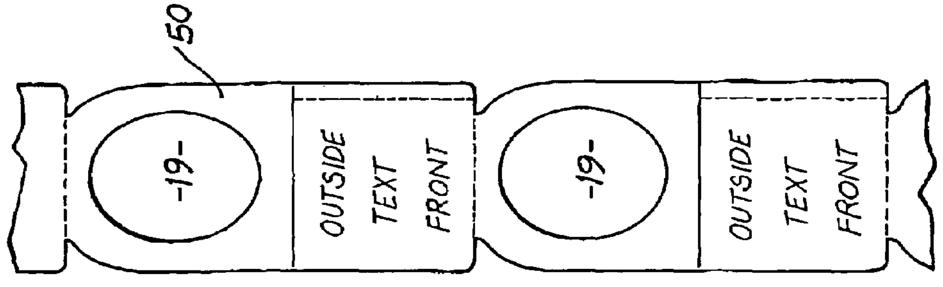
FIG. 4*b* shows the section of web of FIG. 4*a* after it has been folded, die-cut, and waste material has been removed.
Figure 4A:
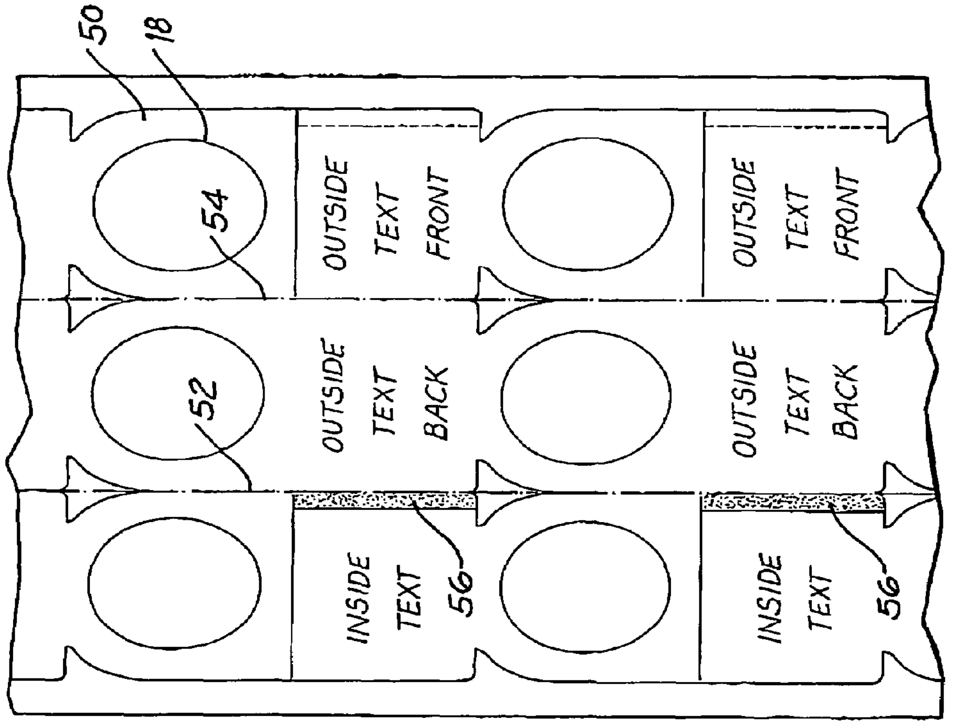
FIG. 4*a* is a front view of a section of a web on which a hanging labels having a fourth design has been printed.

FIG. 4*a* shows one side of a web on which a yet further label design is shown in which the resultant label 50 has two folds 52, 54 and three layers. Text may also be printed on the reverse side of the web in registration with the front side. FIG. 4*b* shows the web after it has been plough folded to define a plurality of conjoined hanging labels. Glue is applied in the area 56 to seal the label closed.

Figure 5:
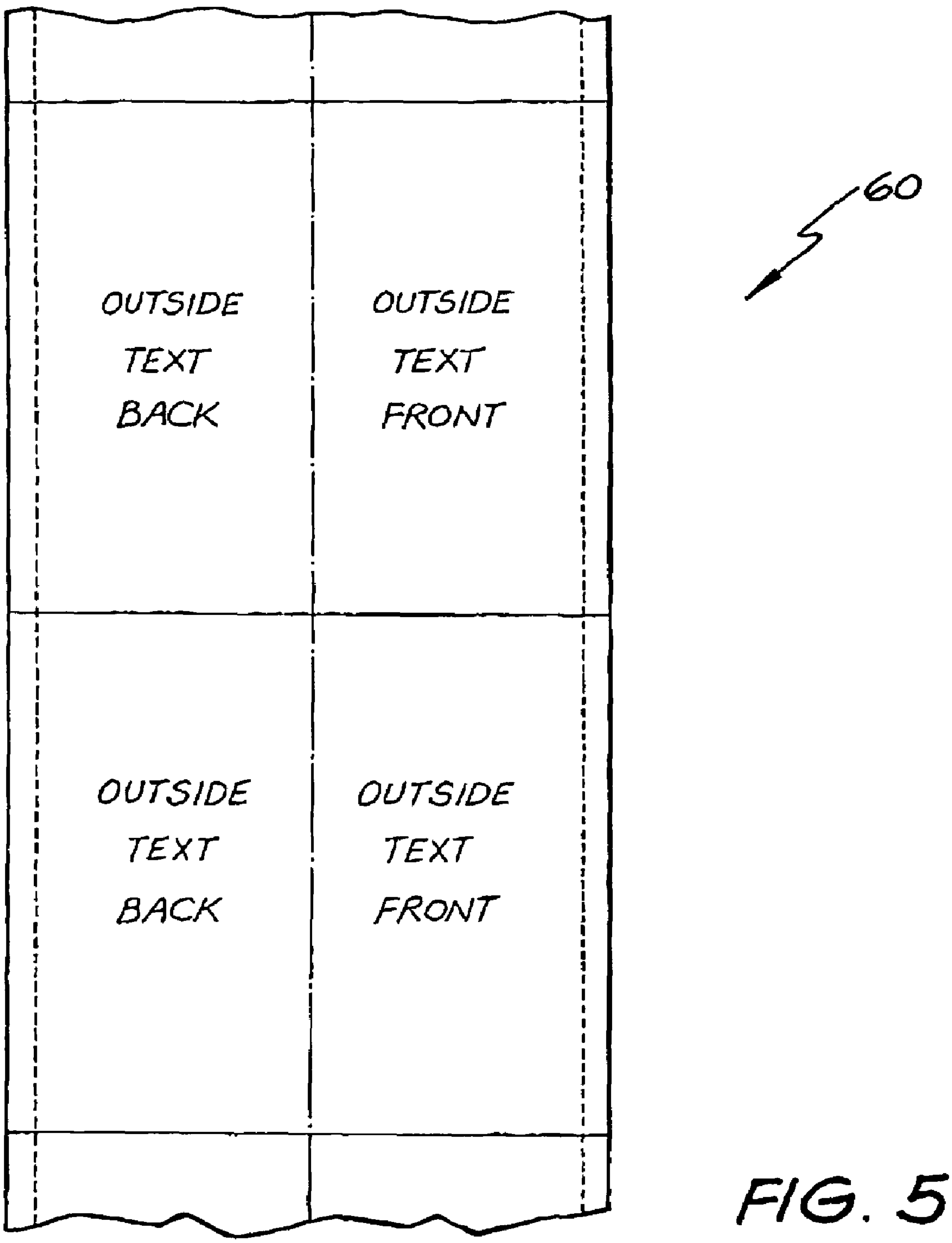
FIG. 5 is a front view of a yet further label design.

FIG. 5 shows a front face of a web 60 on which a further leaflet design has been printed. On the reverse face of the web, not shown, inside It for the label is printed. In contrast with the labels shown in FIGS. 1 to 4, the label shown in FIG. 5 is not a hanging label therefore does not define a circular aperture 19, but is of the type that may be simply glued or otherwise attached to the exterior of a container or the like.

All the different embodiments of folded labels described above can be stored on rolls for use prior to the labels being separated form one another and dispensed onto containers. Alternatively, the labels may be folded in a zig zag or "fanfold" pattern, one above the other in boxes or the like.

It will be appreciated by the person skilled in the art that the label designs shown in the drawings are exemplary only and that the shapes of the labels may be changed without departing from the invention.

Figure 6:
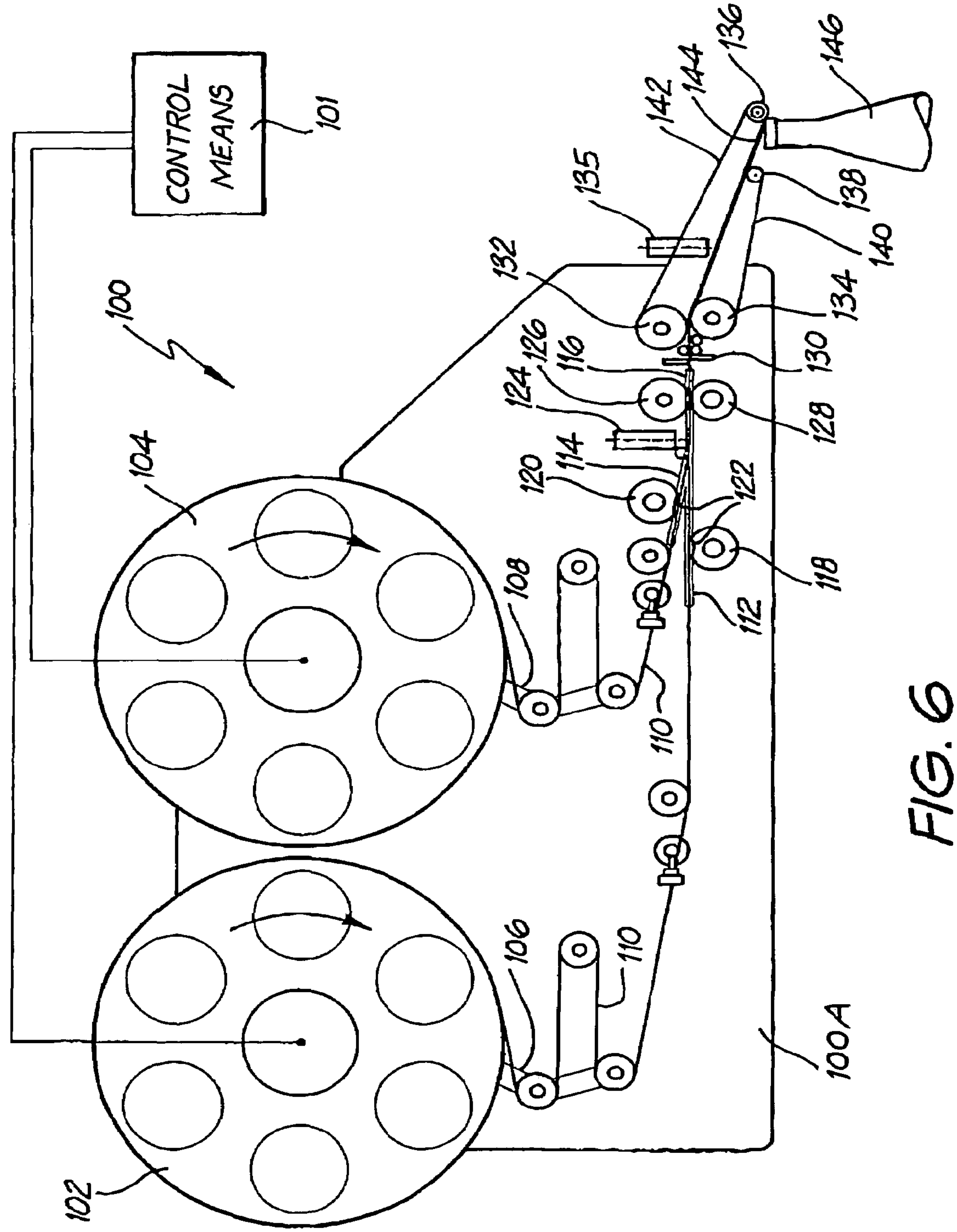

FIG. 6 shows a schematic drawing of a label applying apparatus 100 for applying the rolls of labels described and shown in FIGS. 1 to 4 over the neck of a bottle. The apparatus includes an automatic splicing means which enables continuous operation of the labelling apparatus 100. The apparatus includes a framework 100A on which various components of the apparatus are mounted including two reel loading stations 102, 104. Each loading station includes a proximity switch, not illustrated, which provides a signal to an operator and/or to a control means 101 when the reel is close to finishing. Each reel 102, 104 has an associated unwind arm, 106, 108 respectively, which feeds web material 110 from the respective reels towards guide means 112, 114.

Figure 7:
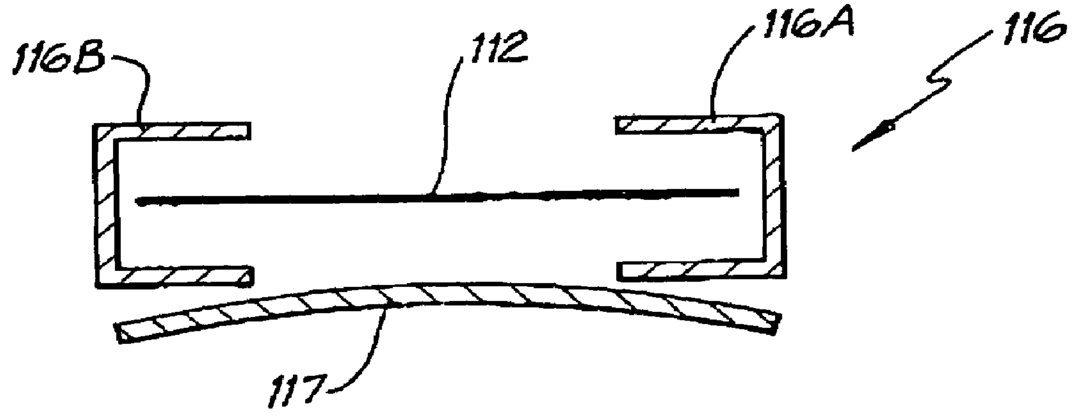
FIG. 7 shows a schematic side view of a guide which forms part of the label application apparatus as shown in FIG. 6.

The guide means 112, 114 merge to form a single guide channel 116. A schematic section through guide means 116 is shown in FIG. 7—the section is the same as that through guide means 112 and 114. The guide means comprises two opposed C-shaped sections 116A, B which support the edges of the web 110 and a curved support 117 which inhibits the web from dropping out from between the supports 116A, B.

An interchange feed roller 118, 120 is associated with each respective guide channel 112, 114. Each interchange feed roller is generally cylindrical apart from one part where it defines a flat section 122. The interchange feed rollers are linked by a servo mechanism, are driven by the same motor and rotate synchronously.

Figure 8:
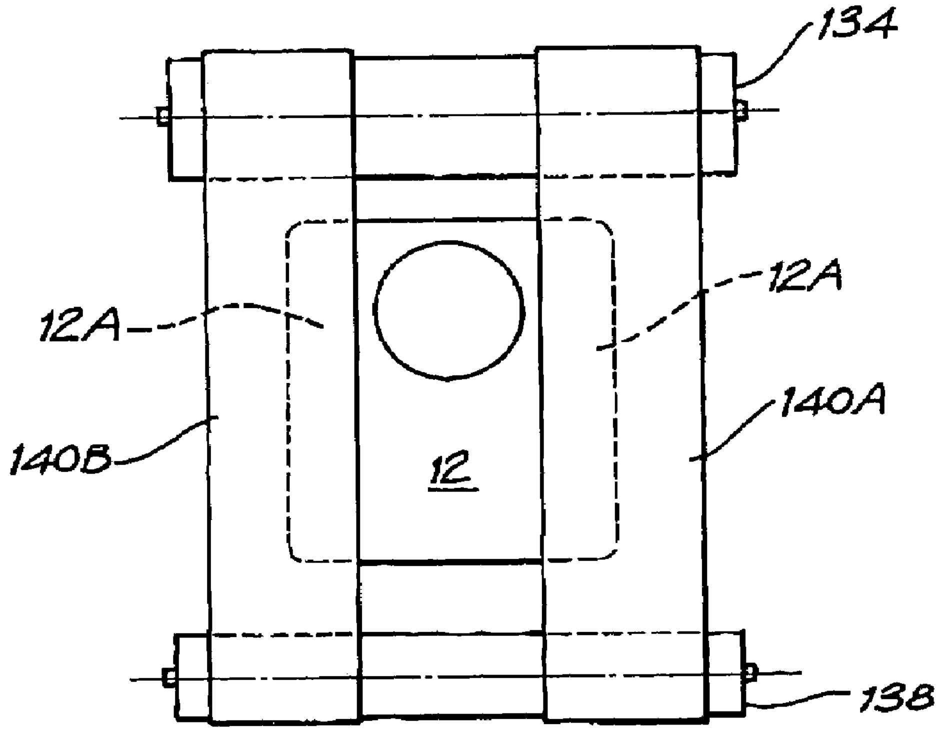
FIG. 8 is a schematic view of a belt feed system which forms part of the label application apparatus shown in FIG. 6.

After the point where the two web guide channels 112 and 114 merge, an index scanner 124 is provided which informs the control means 101 when a registration mark on a label forming part of the web of labels passes it. Following the index scanner, there is a pair of feed rollers 126, 128. At the end of the guide channel there is a cutting knife 130, scissor or the like or alternatively a rotary cutting means, not shown. Further feed rollers 132, 134 are defined after the cutting knife 130. Each feed roller 132, 134 is associated with a further roller 136, 138 respectively and belt drives extend between rollers 132 and 136 and 134 and 138. FIG. 8 shows a top schematic view of the lower belt drives associated with rollers 134 and 138. As shown two endless belts 140A, 140B extend between the two rollers. The belts are spaced apart The arrangement of upper belts 142 around rollers 132 and 136 may be similar but is more typically a single wider belt or multiple belts. Thus, with reference to FIG. 8, labels 12 which are fed between the two guide rollers 132, 134 are carried along the belt drive with the longitudinal edges of the labels 12A held between the lower belts and the upper belt(s). This leaves the central area of the label uncovered from the underside at least, depending on the type of upper belt employed, and allows hot melt adhesive or the like to be applied to that central area, if desired.

A web fault index scanner 135 is provided after the rollers 132, 134.

As illustrated in FIG. 6 a vacuum section 144 may be defined by the upper belts to retain the label against the upper belts for releasing the label onto the neck of a bottle or for carrying it onto products.

In use, each loading station will ideally be loaded with a reel of labels for dispensing, although only one loading station need be loaded. The operator then feeds the end of the web of one only of the loading stations into the guide channel 112 or 114 and passes the interchange feed roller associated with that guide channel. At this stage both interchange feed rollers are oriented with the flat portion 122 aligned with the guide means to make feeding of the web easier. The motor associated with the interchange feed rollers is then started, and as only one of the guide channels is loaded with a web, only the web in that feed channel will be fed through the guide means past the index scanner to the feed rollers 126, 128. As soon as the index scanner 124 reads a registration mark on the label and informs the control means 101 that the web has been engaged by the feed rollers 126, 128, the feed rollers 118 and 120 are stopped with the flat portions again parallel to the guide means so that both interchange feed rollers are disengaged from the web.

The web is then fed by the feed rollers 126, 128 through the cutting means 130, through the feed rollers 132, 134 until the registration point of the label reaches the web fault index scanner 135. The scanner 135 is located such that when the registration point or end of the label is detected by the index scanner 135, the bottom end of the label 12 is located at the knife 130 and the knife is then operated by the control means to separate the label from the web. The label is then fed along the belt means onto a bottle 146 which may be carried on a conveyor, or carousel or any suitable such means. It is possible, in use, to move the belt drive more quickly than the web feed, if desired. It may typically move at twice the speed of the web through the apparatus. The vacuum section 144 assists in the retaining and accurate release of the label above the neck of the bottle.

The web 112 continues to feed through in the manner described above until the last label is reached on the loading station 102 at which time the proximity detector alerts the operator to the fact that the second reel 104 will have to be prepared. Ideally, the last label will be attached to the loading station by removable adhesive so that the last label may be utilised rather than discarded. The operator then ensures that the end of the web on reel 104 is located in the guide channel 114 and extends past the feed roller 120. The index scanner 124 detects when the last label on reel 102 passes the scanner and after the end of that label has passed, activates the feed roller 120 so that the machine then begins automatically dispensing labels from reel 104. The operator then reloads reel 102 and the process continues.

Figure 9:
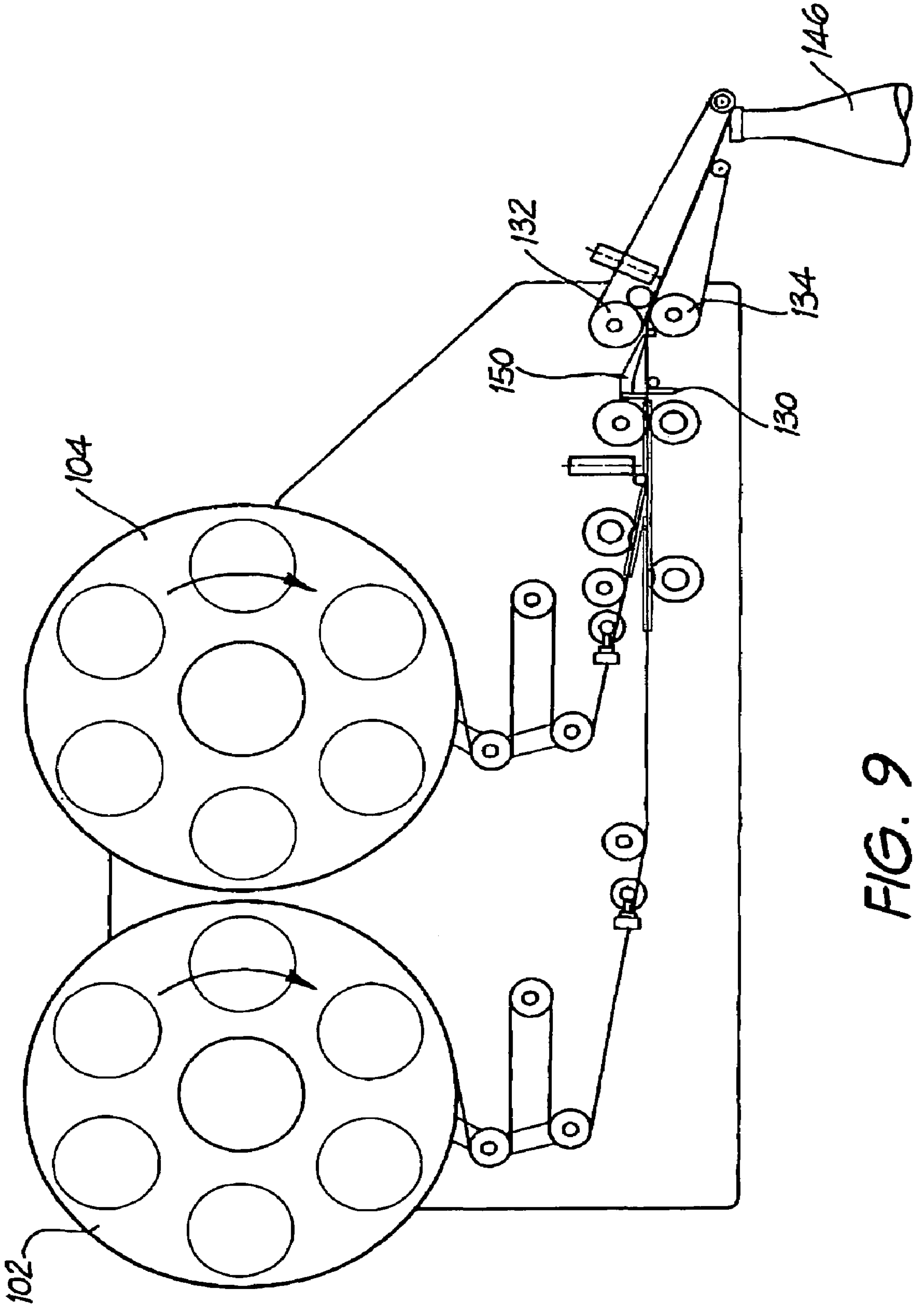
FIG. 9 shows a variant of the apparatus of FIG. 6.

FIG. 9 shows a variant of the apparatus of FIG. 6 which is substantially identical to the apparatus of FIG. 6 except that it includes a folding bar 150 defined between the cutting means 130 and the feed rollers 132, 134 which applies a transverse crease to the hanging label 12. Instead of a folding bar, a rotary creasing device may be employed.

Figure 10:
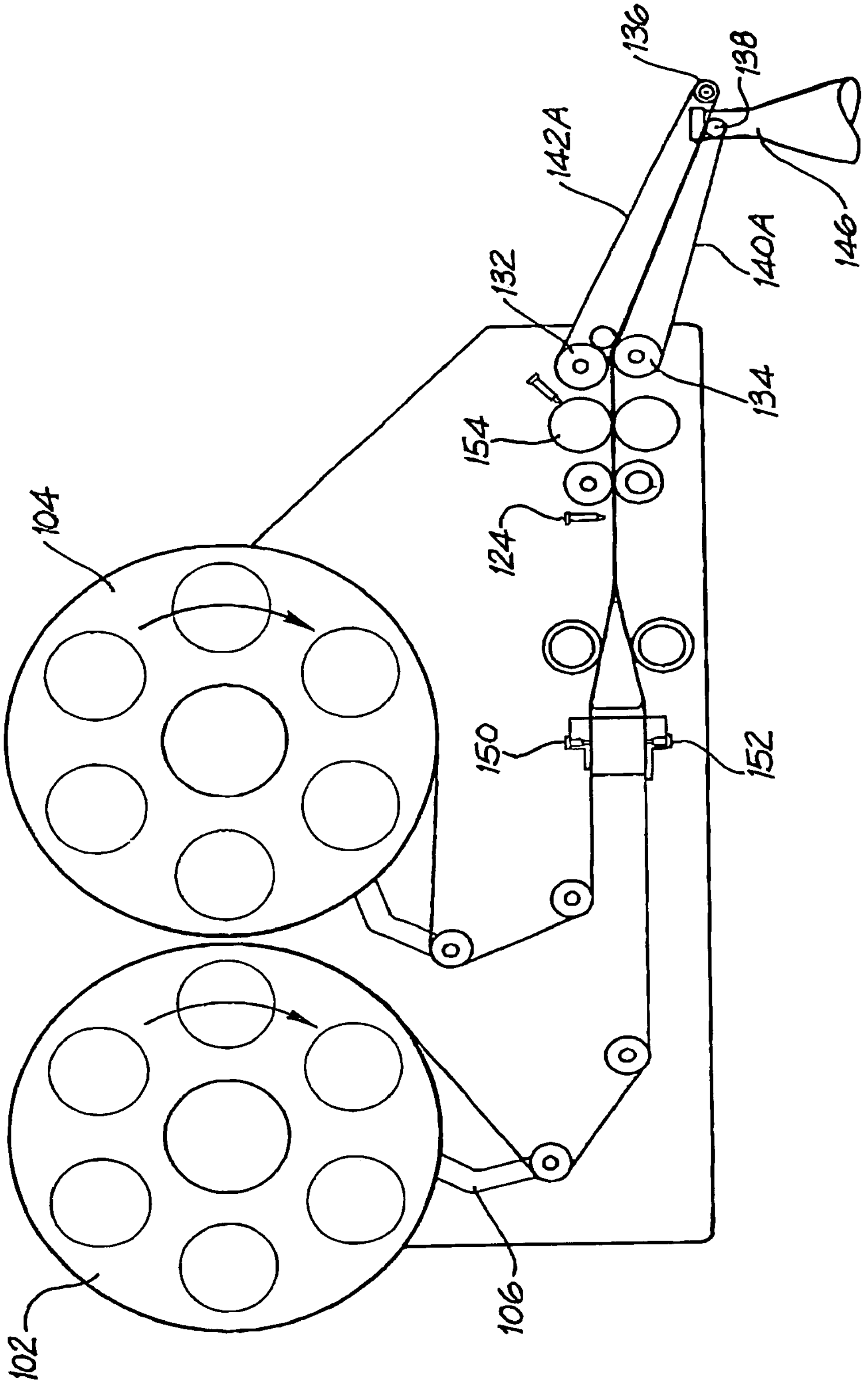
FIG. 10 shows a further variant of the apparatus of FIG. 6.

FIG. 10 shows a further variant of the apparatus of FIG. 6. In this embodiment, the lower belt drives 140, which carry the label to the neck of the bottle, extend further with the lower roller 138 located close to the roller 136 of the upper belt drive 142. The upper belt drive also comprises two spaced apart endless side belts 142A, 142B. In use, the neck of the bottle 146 locates between rollers 136 and 138 and between the lower side belts 140A, 140B (see FIG. 8) and the upper side belts 142A, 142B. The longitudinal edges of the label are carried between upper and lower side belts pairs 140A, 142A and 140B, 142B, respectively. Between the side belts, there is a gap along which the central part of the label is carried and which receives the neck of the bottle 146 This arrangement allows the side belts to accurately carry the label to the top of the bottle and accurately and firmly locate the hanging label over the bottle neck. The belts 140, 142 are driven by servo motors which are synchronised with the bottle 146 handling apparatus. The apparatus also includes "web present sensors" 150, 152 and a rotary knife 154.

Figure 13:
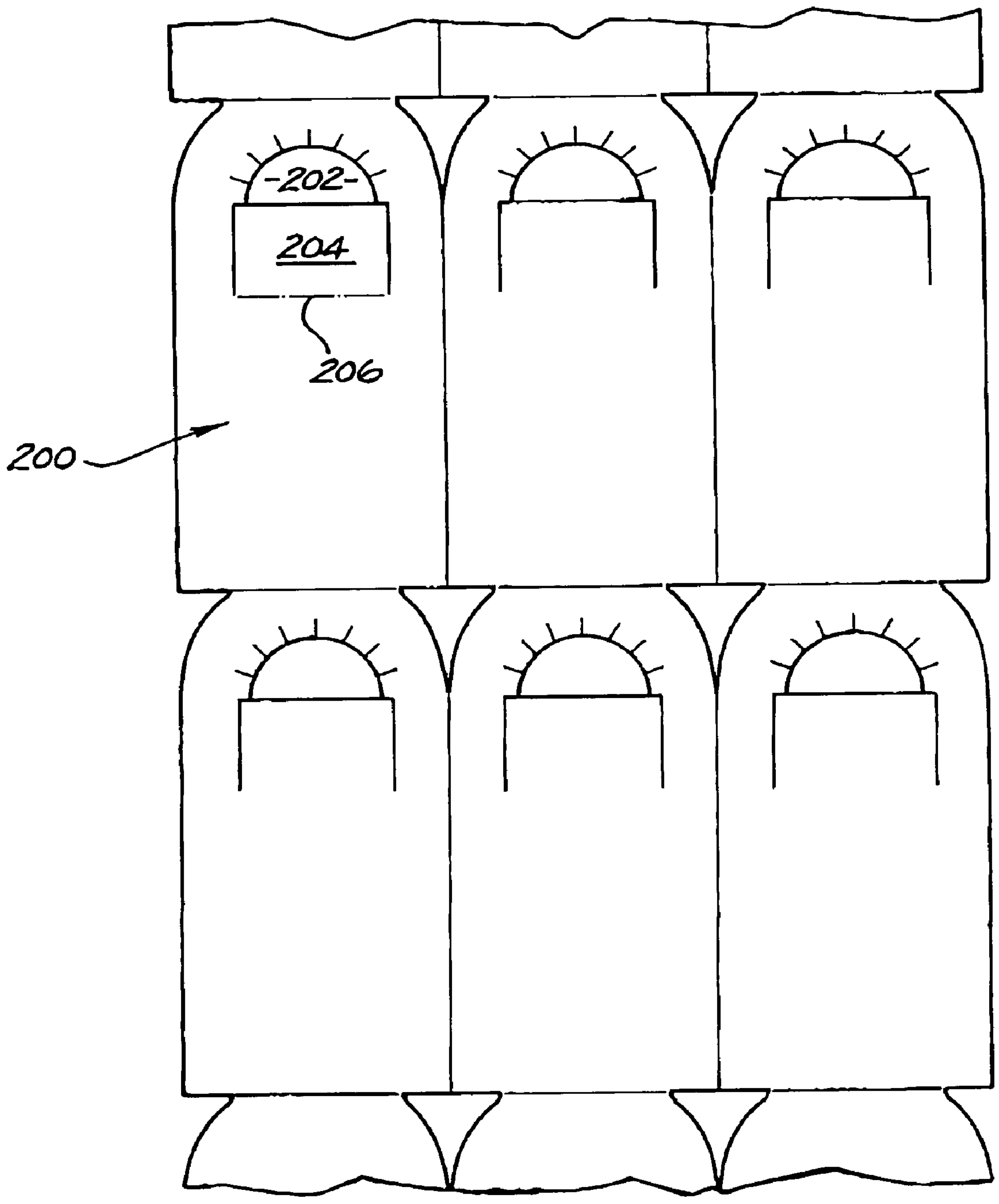
FIG. 13 shows a further hanging label design including a cantilever type biasing means to press the label to the neck of the bottle.

FIG. 13 illustrates a novel hanging label 200 which is particularly suited to application by the apparatus of FIG. 10. A semi-circular aperture 202 is defined at one end of the hanging label, adjacent a rectangular flap portion 204 which is cut out from the label and joined to the label along one side 206, only. The label 204 pivots or is cantilevered about the pivot line 206.

When the label 200 is applied over the neck of the bottle, the flap 204 acts as a cantilever or biasing means and biases the main body of the label 208 to lie against the side of the bottle, rather than project as tends to occur with looser fitting hanging labels.

Figure 11:
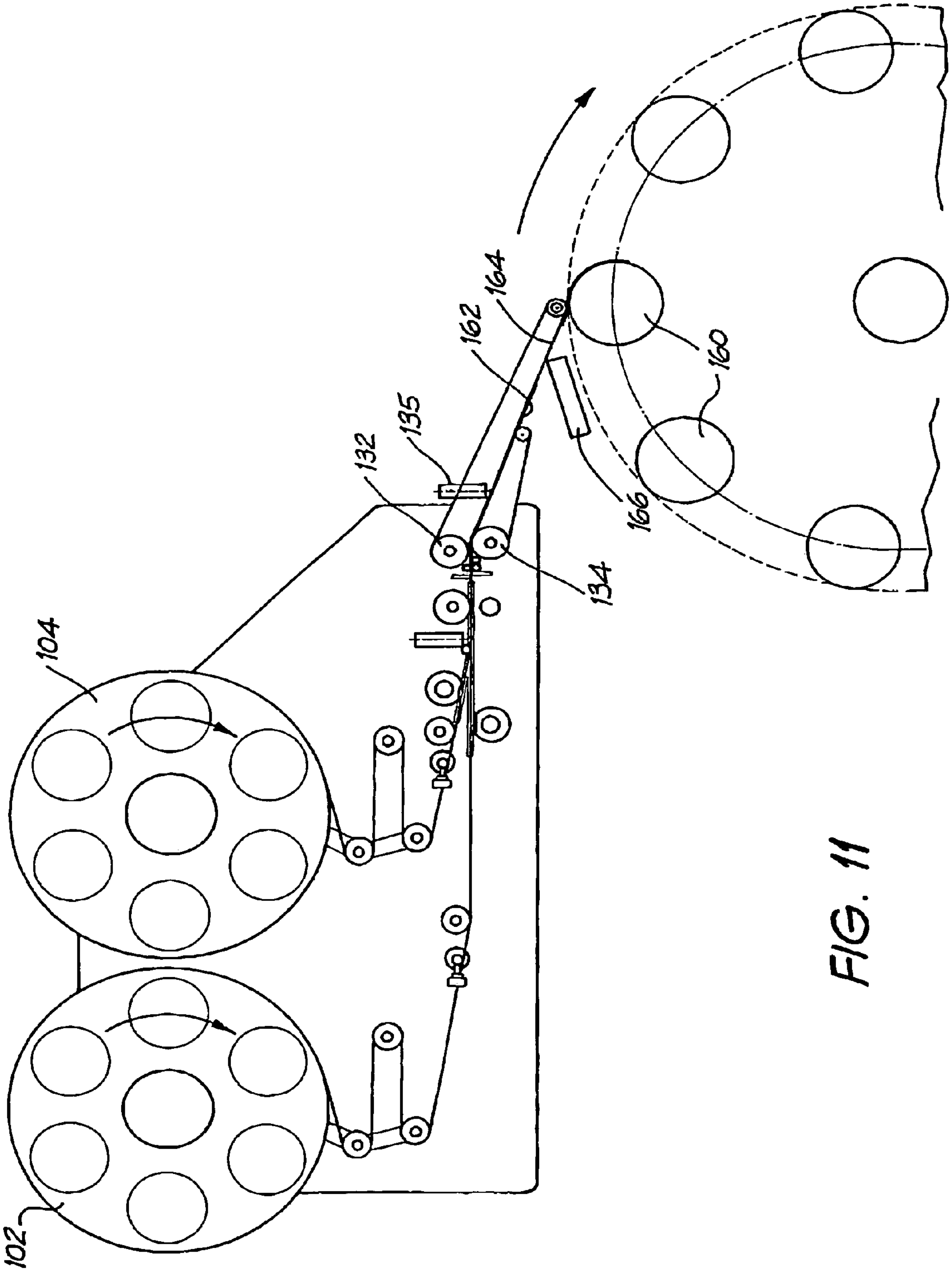
FIG. 11 shows a yet further variant of the apparatus of FIG. 6 used to apply a label to a container having a generally cylindrical cross section.

FIG. 11 shows a yet further variant of the apparatus of FIG. 6. The apparatus is again substantially identical to the apparatus of FIG. 6 except for the applicator end of the apparatus and the orientation of the apparatus. The applicator end is modified to allow the apparatus to apply labels to the body of a cylindrical object such as a wine bottle. The labels need not be multi-layer labels of the type described with reference to FIGS. 1 to 5 but may be single layer labels printed on one side only but they must form a continuous web ie be joined to one another for use on the apparatus. Bottles 160 are carried on a carousel and a label 162 is carried by a belt drive 164. Adhesive is applied by an applicator 166 to the rear of the label to the leading edge of the label as it is applied to the bottle and to the trailing edge of the label. The label is stretched around the bottle as it is applied with the trailing edge being stretched over and glued on top of the leading edge.

Figure 12:
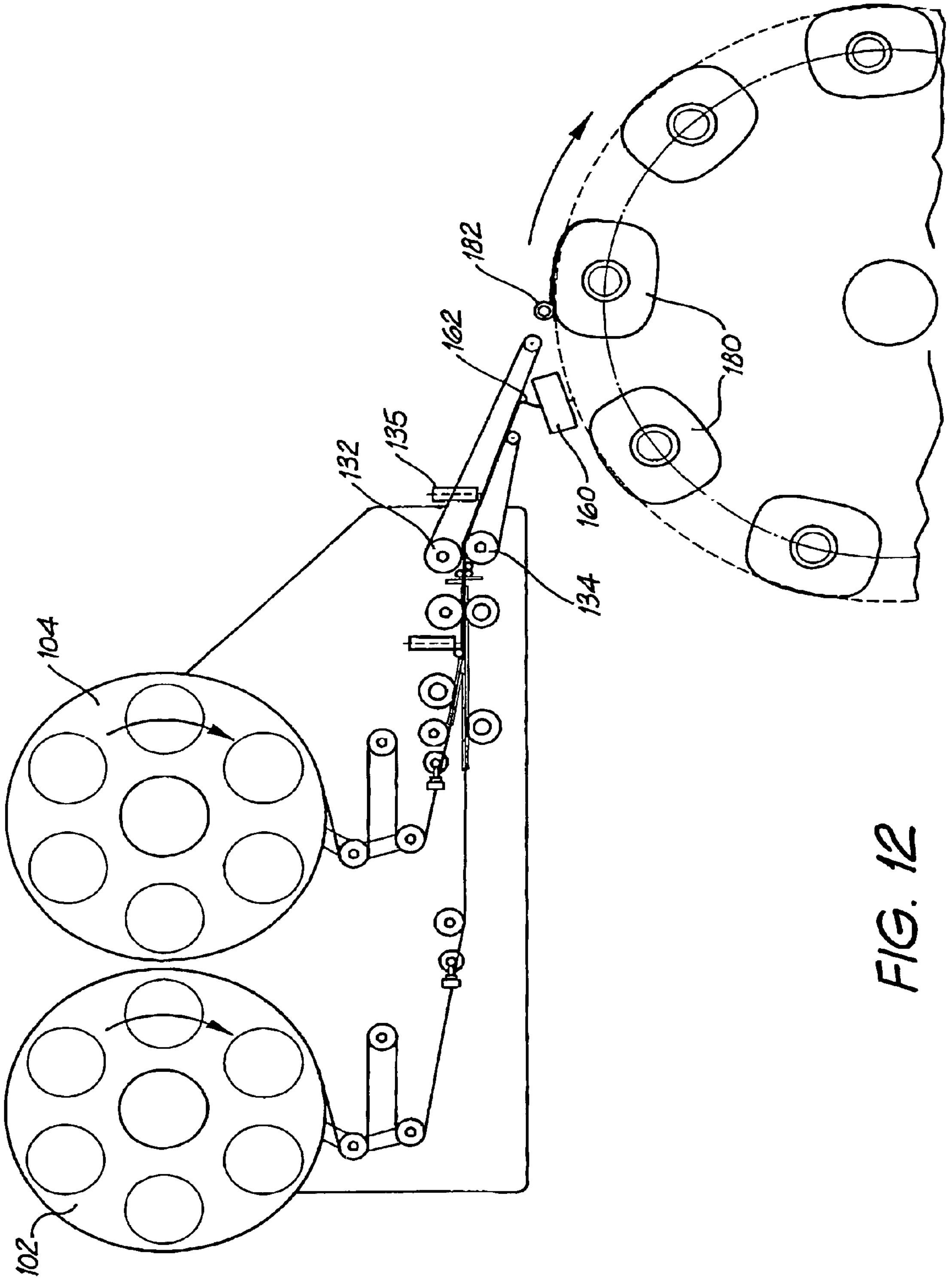
FIG. 12 shows a yet further variant of the apparatus shown in FIG. 6 used to apply labels to the body of a generally rectangular container.

FIG. 12 shows a yet further variant of the apparatus of FIG. 6. The apparatus is again substantially identical to the apparatus of FIG. 11 except for the applicator end of the apparatus. In this case the carousel carries containers 180 having a rectangular section and the single layer labels are applied to one side of the container using glue from applicator 160 which can apply adhesive either to the back of the label or more preferably to the container itself. A roller 182 smooths the label onto the side of the container.

Both of the apparatus of FIGS. 10 and 11 can also be used to apply multilayer labels, if desired.

The above apparatus described in FIGS. 6 to 12, can be simply modified to utilise labels to which cured adhesive has been applied, by adding a reactivation means/station before the labels are applied to a container or the like. Modifications can also be made to accommodate fanfolded labels stored in boxes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of applying hanging labels over the neck of a bottle comprising the steps of:

providing a roll of hanging labels joined in a single continuous web, without a separate support web and without a line of weakness between labels each hanging label being planar and defining a neck-aperture extending through the plane of the label;

feeding the hanging label web through a guide channel to an applicator comprising a cutting means disposed adjacent to a feed belt means including an upper and a lower feed belt;

separating a hanging label from the web via the cutting means of the applicator;

transporting and positioning the neck-tag over the neck of a bottle by means of the feed belt means; and releasing the hanging label onto the neck of the bottle, with the aperture encompassing the neck of the bottle.

2. A method as claimed in claim 1, wherein the transporting step includes holding the separated hanging label between two spaced apart lower belts by grasping the edges of the hanging label and leaving the aperture of the separated hanging label exposed for positioning over the neck of the bottle.

3. A method as claimed in claim 2, wherein the hanging label includes an upper portion defining an aperture through which the neck of a bottle may pass and a main body portion and an associated biasing means for biasing the main body portion against the bottle.

4. A method as claimed in claim 1, wherein each hanging label includes an upper portion defining an aperture through which the neck of a bottle may pass, a main body portion and an associated biasing means for biasing the main body portion against the bottle.

5. A method of applying hanging labels over the neck of a bottle in which the hanging labels are carried in the form of a continuous web of material without a separate support web, using an applicator apparatus comprising:

a loading station including first and second reels of hanging labels in a continuous web form, each hanging label encompassing a neck-aperture;

a means for automatically feeding the continuous web of labels from the second reel of hanging labels on exhaustion of the first reel, and vice versa, enabling continuous operation of the apparatus, wherein the last hanging label on each reel is secured to the reef by a removable adhesive means such that it releases from the wheel without damage, for subsequent application to a neck of a container;

a guide channel for receiving the continuous web;

means for feeding the web material to the guide channel;

a cutting means disposed at the end of the guide channel for separating the hanging labels from the continuous web;

and a dispenser for receiving and transporting a separated neck-tag, the dispenser being disposed adjacent to the cutting means and comprising at least one upper belt means and at least one lower belt means for transport and application of the hanging labels over the neck of a bottle or the like located below the lower belt means, the method comprising the steps of:

providing a roll of hanging labels joined in a single continuous web, without a separate support web, hanging labels encompassing neck-apertures;

feeding the web through the guide channel to the culling means; separating a hanging label from the web by mean of cutting means;

transporting the hanging label over the neck of a bottle by means of the upper and lower feed belt means; and depositing the aperture of the hanging label over the neck of a bottle disposed below the lower feed belt thereby hanging the separated hanging label from the neck of the bottle.

6. A method as claimed in claim 5, wherein the hanging labels are multi-layer labels.

7. An applicator apparatus for applying hanging labels over the neck of a bottle each hanging label encompassing a neck-aperture extending through the plane of the label, the applicator apparatus comprising:

a loading station including first and second reels of hanging labels, encompassing neck-apertures, in a continuous web form, without a support web;

a means for automatically feeding the continuous web of labels from the second reel of hanging labels on exhaustion of the first reel, and vice versa, enabling continuous operation of the apparatus, wherein the last hanging label on each reel is secured to the reel by a removable adhesive means such that it releases from the reel without damage, for subsequent application to a neck of a bottle;

a guide channel for receiving the continuous web fed from the first or second reels, and means for feeding the continuous web along the guide channel;

a cutting means disposed at the end of the guide channel for separating a hanging label from the continuous web of hanging labels; and a dispenser means for receiving and transporting a separated hanging label, the dispenser means being disposed adjacent to the cutting means and comprising at least one upper belt means and at least one lower belt means for transport and application of the hanging labels over the neck of a bottle located below the lower belt means.

8. An applicator as claimed in claim 7, wherein the lower feed belt means comprises two spaced apart feed belts and the transporting step includes holding the separated hanging label between the two spaced apart lower belts by grasping the edges of the hanging labels and leaving the aperture of the separated hanging label exposed between the spaced apart belts for positioning over the neck of the bottle.

9. An applicator as claimed in claim 7, wherein the cutting means is a rotary cutting means.

* * * * *